United States Patent [19]

Bennet

[11] Patent Number: 4,984,559
[45] Date of Patent: Jan. 15, 1991

[54] SPIRIT STOVE

[75] Inventor: Tom J. Bennet, Haverdal, Sweden

[73] Assignee: Aktiebolaget Electrolux, Stockholm, Sweden

[21] Appl. No.: 436,417

[22] Filed: Nov. 14, 1989

[30] Foreign Application Priority Data

Nov. 15, 1988 [SE] Sweden .............................. 8804115

[51] Int. Cl.⁵ .............................................. F24C 5/00
[52] U.S. Cl. ................................... 126/43; 126/39 K; 126/38; 126/27
[58] Field of Search ..................... 126/43, 29, 38, 37 A, 126/52, 39 E, 39 K, 332, 337 A, 27, 38, 261, 265, 262

[56] References Cited

U.S. PATENT DOCUMENTS

| 2,091,530 | 8/1937 | Slavin et al. ........................ 431/154 X |
| 2,148,777 | 2/1939 | Schneider et al. .................. 126/39 K |
| 3,900,281 | 8/1975 | Penberthy ............................ 431/344 |
| 4,416,617 | 11/1983 | Ebbeson .............................. 126/43 X |
| 4,544,348 | 10/1985 | Boij .................................... 126/43 X |

Primary Examiner—Larry Jones
Attorney, Agent, or Firm—Pearne, Gordon, McCoy and Granger

[57] ABSTRACT

A spirit stove comprises a fuel container (14) having an opening (15) through which fuel can be poured to fill the container, and through which combustion by-products are exhausted during burning. The stove has a burner tube (23) placed above the opening and a flame spreader (39) situated above the burner tube. The flame spreader is pivotally mounted to the spirit stove and can be moved from a first position in which it covers the opening (24) of the burner tube to a second position in which a slot is created between the flame spreader and the burner tube which is large enough to admit an igniter to be inserted into the burner tube, the flame spreader in the last mentioned position still generally covering the opening of the burner tube to inhibit direct pouring of fuel down into the opening (15).

7 Claims, 1 Drawing Sheet ered flame spreader can be upwardly raised from a
SPIRIT STOVE

BACKGROUND OF THE INVENTION

This invention relates to a spirit stove or the like comprising a fuel container having an opening through which fuel is poured to fill the container and through which the fuel combustion by-products leave during burning, a burner tube which is placed above the opening, and a flame spreader which is situated above the burner tube.

Stoves of the kind described are well known and have been widely used as camping stoves in boats and campers. On up-to-date stoves the fuel container holds an absorbing mass for the fuel to keep the fuel in the container if the container is tilted or is turned upside down. The fuel evaporates during burning from a free surface of the absorbing mass, the free surface being located at the opening of the container. The container is filled by removing it from the remaining parts of the stove after which the fuel is poured directly into the opening to fill the container containing the absorbing mass.

Of course, it is of greatest importance from a safety point that any remaining flames are not present on or in the container when it is filled with fuel. This can easily be established when the container is separated from the stove. When the fuel container, however, is mounted at its usual position within the stove, and the container opening is partly hidden behind other parts of the stove, it is difficult to observe any remaining flames. Since the free surface of absorbing mass in the fuel container has to be accessible from the upper side of the stove for proper ignition of the fuel, a vertical passage is formed by the burner tube which might tempt the operator to fill the fuel container from above directly down into the container opening. If in such a case a remaining flame exists in the fuel container an accidental fire might easily occur. In order to reduce the risk for such an accident, there are warning texts in the manual as well as on the stove against filling the fuel container when it is in its operating position within the stove. In spite of this, accidental fires still occur because of improper fueling as noted above.

It is common to use a so called "flame spreader" on spirit stoves, the spreader being placed above the flame at the top of the burner tube. The purpose of these flame spreaders is to achieve a better burning of the fuel and hence less odor. The flame spreader also decreases the creation of soot and limits the extension of the flame in the height direction. The flame spreader usually comprises a metal plate having several holes and is placed immediately below the cooking pan. Such a flame spreader has been so arranged that it can easily be turned aside or be completely removed in order to expose the opening of the underlying fuel container to facilitate fuel ignition.

The purpose of this invention is to provide a spirit stove wherein it is impossible or at least difficult to fill the fuel container when it is in its operating position in the stove, while at the same time allowing fuel ignition in the traditional way by means of a special igniter or by means of a match.

SUMMARY OF THE INVENTION

In accordance with the present invention, a pivotally mounted flame spreader can be upwardly raised from a normal horizontal position to an inclined position so as to admit entry of an igniter into an underlying burner tube, while still generally covering the upper end of the burner tube to inhibit the pouring of fuel directly down into the burner tube.

BRIEF DESCRIPTION OF THE PREFERRED EMBODIMENT

One embodiment of the invention will now be described with reference to accompanying drawings in which FIG. 1 is partly sectional vertical projection of a device according to the invention, whereas FIG. 2 in a top view shows a part of said device.

DETAILED DESCRIPTION OF THE PREFERRED EMBODIMENT

Figure 1:
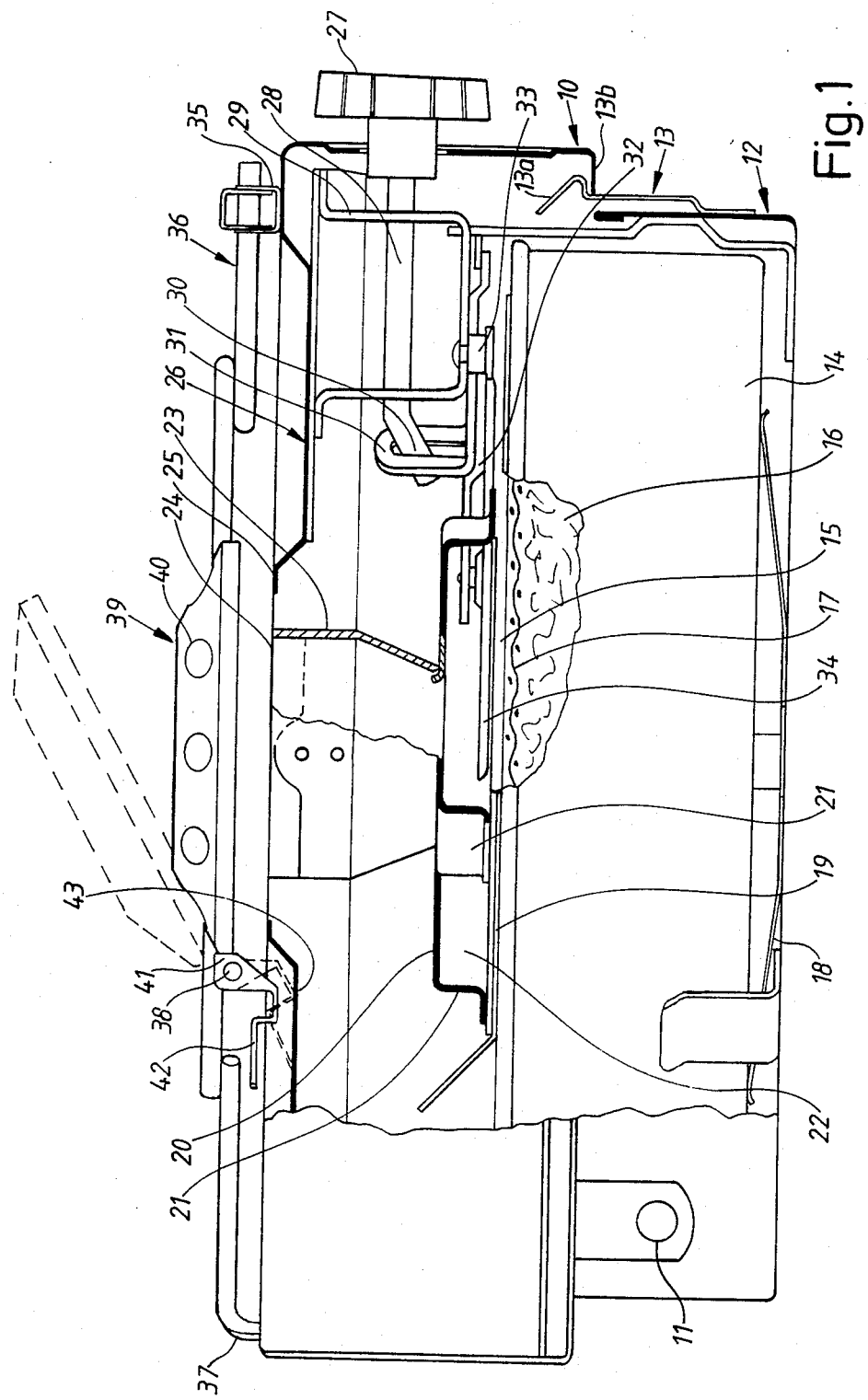

With reference to FIGS. 1 and 2, a stove according to the invention comprises a cover part 10 which by means of a hinge structure 11 is pivotally mounted to a bottom part 12. The parts 10 and 12 are shown in a folded-together position locked to each other by means of a catch device 13 consisting of a resilient tongue 13a fastened to the bottom part, the tongue having a hook engaging an inwardly turned shoulder 13b on the cover as illustrated. Between the cover part 10 and the bottom part 12 a fuel container 14 is placed. This container comprises a cylindrical and comparatively low profile metal hood which provides at its upper central portion an opening 15 through which fuel combustion by-products leave during burning and through which a fuel is poured to fill the container 14. The interior volume of the container houses a fuel absorbing mass 16, a free surface of which at the opening 15 is covered by a grating 17 for keeping the mass in the container. The fuel container 14 is supported from below by a leaf spring 18 which is placed in the bottom part 12 and which, when cover part 10 is folded down, pushes the container 14 against an annular shaped plate 19. This plate 19 is, via several sheet metal legs 21, fastened to an annular shaped collar 20. Between the collar 20 and the plate 19 is an inlet slot 22 for primary air influx to a burning area at the opening 15. The inner circular periphery of the collar 20 is connected to a vertically extending burner tube 23, the lower part of which is somewhat diverging in the upwards direction whereas the upper part is cylindrical. An upper opening 24 of the burner tube is placed at the same height as a central part 25 of a range surface element 26 which, as well as the outer edge part of range surface element 26, is somewhat extended upwards as illustrated with respect to the range surface element portions therebetween.

The cover part 10 also comprises an extinguishing device consisting of a knob 27 which is accessible from the outside of the cover part 10 and which is fixed to an outer end of a bent shaft 28. The shaft 28 is supported in a yoke member 29 which extends downwardly from the range surface element 26 and has an inner shaft end 30 which makes an angle with the shaft axis. This end 30 is free with respect to a lug 31 which is a part of an arm 32 extending hoizontally outwards from a fastening point 33 on the yoke member 29. The fastening point operates as a vertical turning or pivot axis. The outer part of the arm 32 supports a circular plate 34 which can be moved into the slot 22 between the collar 20 and the annular plate 19 so that it completely covers the opening which is formed at the center of the annular shaped plate 19. By turning the knob 27, the plate 34 can be positioned to uncover a larger or smaller area of the opening 15 of the fuel container thereby increasing or decreasing the size of the flame and also extinguishing it completely.

On two sides of the range surface element 26 there is a U-shaped fastening means 35 for a cooking pan support 36. This pan support 36 comprises several horizontally extending, interconnected, bent bars which, via a downwards directed bend portion 37 situated at the rear side, rests against the range surface element 26.

The pan support 36 also includes a shaft 38 which is parallel to the range surface element 26 and is placed beside the upper opening 24 of the burner tube 23. On this shaft 38 a flame spreader 39 is supported. The flame spreader 39 comprises a metal plate having the shape of an inverted saucer providing inclined surfaces having several holes 40. The flame spreader is fixed to a yoke 41 which is U-shaped and rests on the shaft 38. The yoke 41 extends to provide a tongue 42 which is located above the range surface element 26 and which can be depressed against an abutting stop surface 43 on the range surface element 26 thereby lifting the flame spreader. Between the flame spreader 39 and the opening 24 of the burner tube 23 there is formed a slot for entry of secondary air.

The normal position of the flame spreader 39 appears from the full lines in FIG. 1, whereas the dotted lines show the flame spreader 39 when the tongue 42 is manually depressed against the surface 43. Because of the limited possibility of movement of the tongue 42, it is not possible to lift up the flame spreader 39 more than what is shown in FIG. 1. Since the flame spreader 39 in this position still generally covers the opening 24 of the burner tube 23 it is not possible for a person to pour fuel from above directly down into the fuel container 14 via the burner tube 23. However it is possible, when the flame spreader 39 is in its lowered position, to put down an igniter or a match down through the burner tube 23 to the opening 15 of the fuel container in order to ignite the fuel.

The angle to which the spreader can be opened of course depends on the size of the flame spreader and the size of the opening of the burner tube, but normally the opening angle could be limited to about 30.

Although the preferred embodiment of this invention has been shown and described, it should be understood that various modifications and rearrangements of the parts may be resorted to without departing from the scope of the invention disclosed and claimed herein.

What is claimed is:

1. In a spirit stove or the like comprising a fuel container (14) having an opening (15) through which fuel is poured into the container and through which fuel combustion by-products leave during burning, a burner tube (23) which is placed above the opening, and a flame spreader (39) which is situated above the burner tube, the improvement wherein the flame spreader is pivotally secured to the spirit stove and can be brought from a first, mainly horizontal position, in which it covers the opening (24) of the burner tube, to a second position in which a slot is formed between the flame spreader and the burner tube which slot is sufficiently large enough to admit an igniter to be inserted down into the burner tube at the same time as the flame spreader in the said second position still generally covers the opening of the burner tube.

2. A spirit stove according to claim 1, wherein the flame spreader (39) is pivotally supported on a horizontal shaft (38) and can be pivotally moved upwards from the first to the second position.

3. A spirit stove according to claim 2, wherein the flame spreader has a tongue (42) located to one side of the shaft (38) which tongue in the first position of the flame spreader can be depressed in order to move the flame spreader (39) to the second position.

4. A spirit stove according to claim 3, wherein the movement of the tongue (42) to the second position of the flame spreader is limited by a stop surface (43) on the spirit stove.

5. A spirit stove according to any one of the preceding claims, wherein the flame spreader (39) is connected to a pan support (36) on the spirit stove.

6. A spirit stove according to any one of claims 2, 3, or 4, wherein the turning movement of the flame spreader (39) is limited to less than 30.

7. Device according to any one of claims 2, 3, or 4, wherein the flame spreader (39) in its first horizontal position is spaced above the opening of the burner tube (23) for forming a slot to permit the entry of secondary air.

* * * * *